United States Patent [19]

Smith et al.

[11] Patent Number: 4,551,368

[45] Date of Patent: Nov. 5, 1985

[54] POLYESTER MELT BLENDS HAVING HIGH GAS BARRIER PROPERTIES

[75] Inventors: Richard R. Smith, Cuyahoga Falls; John R. Wilson, Hartville, both of Ohio

[73] Assignee: The Goodyear Tire & Rubber Company, Akron, Ohio

[21] Appl. No.: 415,211

[22] Filed: Sep. 7, 1982

[51] Int. Cl.$^4$ ............................................. C08L 67/02
[52] U.S. Cl. ..................................... 428/35; 525/444
[58] Field of Search ........................... 525/444; 428/35

[56] References Cited

U.S. PATENT DOCUMENTS

| | | | |
|---|---|---|---|
| 3,651,172 | 3/1972 | Barkey | 525/444 |
| 4,069,278 | 1/1978 | Borman | 525/444 |
| 4,234,708 | 11/1980 | Edleman | 525/444 |
| 4,263,425 | 4/1981 | Rothe | 264/347 |
| 4,361,681 | 11/1982 | Bernhardt | 525/444 |

FOREIGN PATENT DOCUMENTS 53-040048  4/1978  Japan .................................. 525/444

*Primary Examiner*—John C. Bleutge
*Assistant Examiner*—Patricia Short
*Attorney, Agent, or Firm*—Alvin T. Rockhill

[57] ABSTRACT

Melt blends of polyethylene isophthalate with polyethylene terephthalate or polybutylene terephthalate or copolymers thereof have good barrier resistant properties to oxygen. Such blends are useful as packaging materials, for example films, containers, bottles, and the like.

17 Claims, No Drawings

POLYESTER MELT BLENDS HAVING HIGH GAS BARRIER PROPERTIES

TECHNICAL FIELD

The present invention relates to melt blends of polyethylene isophthalate with polyethylene terephthalate or polybutylene terephthalate. Either of the latter two compounds can be a copolymer made from up to 15 mole percent of another monomer. Such blends have good physical properties, good compatability, good processing characteristics, as well as good barrier resistant properties.

In recent years, much activity and invention in the art of polyesters have centered about the development of articles made from polyethylene terephthalate, PET, and to a lesser extent, polybutylene terephthalate, PBT. Containers constructed of PET have recently found wide acceptance in the packaging of food stuffs, medicines, and consumer products.

Despite the popularity of PET in container manufacture, there are several drawbacks to the use of PET. Although PET is considered a high barrier polymer, the use of PET containers for various items such as beer has been avoided due to the rapidity with which beer loses its flavor, due largely to oxygen migration into the bottle. Further, because of the high processing temperatures involved in the manufacture of PET bottles, a significant amount of acetaldehyde by-product is formed during extrusion and molding. This compound, at relatively low concentrations, readily imparts an undesirable or bad after taste to many food stuffs packaged in PET.

BACKGROUND ART

U.S. Pat. No. 3,426,100 to McDonough relates to copolymers of crystallizable linear polyesters and polycarbonates. Although such polyesters have improved properties, they are not pertinent to the present invention since they do not even suggest melt blends of two different types of polyesters.

British Pat. No. 1,546,698 relates to transparent sheets made from blends of polycarbonate and polyethylene terephthalate. However, once again no suggestion is made of melt blends of applicants' specific polyesters.

"Crystallization Studies of Blends of Polyethylene Terephthalate and Polybutylene Terephthalate" by Escala and Stein, Advances in Chemistry series, 176, 455 (1979) relates to a study wherein a single glass transition temperature for a blend is observed which varies with composition suggesting that the components are compatible in the amorphous phase. This article is not pertinent since it does not relate to any use of a melt blend of polyisophthalate.

A fairly thorough discussion of various polymer blends is set forth in "Polymer Blends," Vol. 1, Chapter 10, by Paul and Newman, Academic Press, 1978. However, no suggestion is contained therein with regard to applicants' melt blends of polyesters.

DISCLOSURE OF INVENTION

It is therefore an aspect of the present invention to provide melt blends of polyethylene isophthalate and another polyester such as polyethylene terephthalate or polybutylene terephthalate which have high barrier resistance to oxygen and carbon dioxide.

It is yet another aspect of the present invention to provide polyester melt blends, as above, wherein said blends have improved impact resistance and often crystallinity therein.

It is yet another aspect of the present invention to provide polyester melt blends, as above, wherein said polymers have a reduced drying time.

It is yet another aspect of the present invention to provide polyester melt blends, as above, wherein said blends may be reactor blended or extruder blended.

It is yet another aspect of the present invention to provide polyester melt blends, as above, having improved processability as compared to polyethylene isophthalate.

It is yet another aspect of the present invention to provide polyester melt blends, as above, having abated sticking or none at all as in an extruder.

It is yet another aspect of the present invention to provide polyester melt blends, as above, having a lower melting point than either the polyethylene terephthalate or polybutylene terephthalate component of the blend.

It is yet another aspect of the present invention to provide polyester melt blends, as above, wherein said polyethylene terephthalate or polybutylene terephthalate can exist as a copolymer and thus contain a small amount of another compound in the polymer chain.

It is yet another aspect of the present invention to provide polyester melt blends, as above, wherein said blends can be used as packaging materials such as for containers, films, and the like.

It is yet another aspect of the present invention to provide polyester melt blends, as above, wherein said containers can be bottles which are suitable for containing alcoholic beverages, medicines, and the like.

These and other aspects of the present invention will become apparent from the following description which sets forth the best mode and preferred embodiments of the invention.

In general, a melt blend of polyesters having good oxygen barrier resistance, comprises: the melt product of two or more polyesters, one of said polyesters being polyethylene isophthalate in an amount of from about 5 to about 95 mole percent based upon the total moles of said polyesters, the melt blend having an oxygen permeability of 8 cc·mil/100 in$^2$·day·atm or less and an intrinsic viscosity of 0.4 dl/g or greater.

Additionally, a melt blend of polyesters, comprises: two or more polyesters melt blended to form a high oxygen barrier blend polyester product, one of said polyesters being polyethylene isophthalate, the amount of said polyethylene isophthalate ranging from about 5 to about 95 mole percent based upon the total moles of said polyesters blended, the intrinsic viscosity of said blend product being 0.4 dl/g or greater.

BEST MODE FOR CARRYING OUT THE INVENTION

The present invention relates to melt blends of polyester comprising polyethylene isophthalate and at least one other polyester to provide packaging materials such as films, molded containers, for example bottles and the like, which have very low oxygen as well as carbon dioxide permeability. Polyethylene isophthalate, hereinafter PEI, is melt blended with one or more polyesters to form the blends of the present invention. Generally, the other polyesters are either polybutylene terephthalate (PBT) or polyethylene terephthalate (PET). Although three or more types of polyesters may be utilized, preferably the blend has only two polyester components.

Generally, the amount of PEI to the total blend when used with PBT or PET ranges from about 5 to 95 mole percent, desirably from about 10 to about 90 mole percent, and preferably from either about 10 to about 35 mole percent (good processing properties) or from about 90 to about 65 mole percent (good barrier properties). Unexpectedly, it has been found that the blends of the present invention are generally compatible upon extruding or melt blending and thus there is no separation problems between the two different types of polymers. Additionally, they are readily processed and a high clarity end product is obtained.

The polyethylene isophthalate can be produced according to any conventional method. Typically, isophthalic acid or diesters thereof such as dimethylisophthalate or diethylisophthalate are reacted with ethylene glycol in a conventional manner. For example, all the reactants are commonly added to an esterification or transesterification stage followed by a polycondensation stage to produce the PEI.

In a similar manner, polyethylene terephthalate or polybutylene terephthalate can be made. Additionally, monomers of other dicarboxylic acids or glycol can be utilized in small amounts such that a copolymer of either PET or PBT is made. Generally, an amount of acid or glycol is utilized such that the final PET or PBT copolymer contains up to 15 mole percent of non-butylene terephthalate or non-ethylene terephthalate repeating units therein. Desirably, the copolymer contains at least BT or ET repeating units in the polymer.

When a copolymer is made, the dicarboxylic acid or ester thereof, which is not terephthalate acid or an ester thereof, can be an alkyl dicarboxylic acid, an aryl dicarboxylic acid, an alkyl substituted aryl dicarboxylic acid, or esters thereof having up to 20 carbon atoms. The alkyl dicarboxylic acids generally contain from 4 to 20 and preferably 4 to 12 carbon atoms, while diesters thereof contain from 6 to 20 and preferably from 6 to 12 carbon atoms. The aryl dicarboxylic acids have from 8 to 20 and preferably from 8 to 16 carbon atoms and specific examples include isophthalic acid, naphthalic acid, and the like. Naturally, as part of the copolymer, terephthalic acid is not utilized with either PET or PBT in that it would not form any copolymer. Diesters of aryl dicarboxylic acids have from 10 to 20 carbon atoms.

Alkyl substituted aryl dicarboxylic acids have from 9 to 20 and preferably from 9 to 16 carbon atoms, whereas diesters of alkyl substituted aryl dicarboxylic acids contain from 11 to 20 carbon atoms. Although numerous dicarboxylic acids or diesters thereof can be utilized to form the copolymers, generally naphthalic acid or esters thereof are preferred, with isophthalic acid or a diester thereof being highly preferred.

In lieu of an acid or an ester thereof to form a copolymer, or in association therewith, glycols containing from 2 to 8 carbon atoms can be utilized. Naturally, if the blend is PEI and PET, a glycol other than ethylene glycol can be utilized in an amount of up to 15 percent. If the blend is PEI and PBT, a glycol other than tetramethylene glycol can be utilized to form a copolymer. Examples of glycols include propylene glycol, neopentyl glycol, cyclohexane dimethanol, and the like.

Such copolymers have been found to impart processing advantages as for example reduced sticking upon extruding as well as a copolymer having a lower melting temperature.

The PEI, PBT or PET polyesters, as well as other polyesters can be made according to any conventional process. Generally, in the first stage or esterification stage, the dicarboxylic acid is reacted with the diol at elevated temperatures and usually elevated pressures with the water being removed. In the second stage or the polycondensation stage, a vacuum is gradually applied, generally catalysts are utilized, and water in a diol is withdrawn as a condensation product. Moreover, the process may be modified slightly as by reacting the acid with the glycol in a solution which is a low molecular weight linear oligomer in a manner as set forth in U.S. Pat. No. 4,020,049 to Rhinehart, which is hereby fully incorporated by reference with regard to the method of making the polyester resin. Another well known variation utilizes dimethyl terephthalate or other diesters which react with the glycol in the presence of catalysts yielding bishydroxyethylterephthalate compound. A stabilizer may then be added as well as catalyst and the polycondensation reaction is carried out to yield the polyester. Additionally, in forming the individual polyesters, solid state polymerization can be carried out in accordance with methods and procedures as well known to the art. Also during the esterification or transesterification of the various polyesters, that is polyethylene isophthalate, polyethylene terephthalate, polybutylene terephthalate, and the like, conventional temperatures and catalysts as well as conventional amounts of catalysts can be utilized. For example, the temperature will range from about 180° C. up to about 300° C., with a preferred range being from about 180° C. to about 280° C. Following completion of the esterification or transesterification reaction, the low molecular weight oligomer produced is subjected to polycondensation which is carried out at temperatures ranging from about 220° C. to about 280° C., and under a high vacuum, that is less than 1.0 mm of mercury and preferably less than 0.5 mm of mercury. Conventional catalysts for the esterification stage include compounds of zinc, magnesium, calcium, manganese, lead, and titanium-containing compounds. That is, effective catalytic amounts of transition metal compounds, alkaline earth metal compounds, or alkali metal compounds with the acetate, manganese acetate, calcium acetate, titanium alkoxides, e.g., titanium tetrabutoxides, and the like. Suitable polycondensation catalysts include antimony acetate, antimony trioxide, antimony pentoxide, titanium alkoxide, organotin oxides, e.g., stannous alkoxides, and the like. Conventional amounts of catalysts range from about $10^{-5}$ to about $10^{-3}$ moles of catalysts per mole of total acid or ester utilized.

The above individual polyesters made in accordance with conventional methods and processes are then blended to form a polyester blend of the present invention. The blending can occur through either reactor blending or blending with an extruder. In extruder blending, preblended dry chips are usually mixed together. In reaction blending, one of the specific polymers is added to the other at the end of the melt polymerization step. A third procedure involves merging two reaction melt streams together and mixing them. Regardless of which blend process is utilized, the temperature of mixing must be at a temperature above the melting point of the highest melting polyester. Generally, such mixing temperature is from about 20° to about 40° C. above said highest melting point polyester. By melting point is meant the thermodynamic crystallite melting point.

Heretofore, PEI has been very difficult to process. For example, drying of PEI polymer would conventionally be carried out at 50° C. for two weeks. PET would be dried at approximately 150° C. for eight hours. Very dry polymers were needed in order to prevent hydrolysis of the polymers. Further, PEI must generally be processed at 420°–480° F. which causes sticking problems, as in the throat zone of the extruder. Attempts have been made to cool a screw to prevent such sticking, but extruding problems still existed.

The blends of the present invention have improved processing properties. For example, it is unexpectedly found that drying times were largely reduced, that the melting points of the melt product were reduced, as compared to PET or PBT homopolymers, enabling extruding or injection molding to be carried out at lower temperatures, and that the sticking problem to extruders was largely abated and eliminated. Thus, whereas before, an almost insurmountable problem with regard to processing of PEI existed, the melt blends of the present invention unexpectedly have resulted in good processing characteristics as well as good barrier properties. Although the exact reason is not known, it is thought that blends of the present invention have microdomains or areas of PEI as well as microdomains of crystalline PET or PBT. This is thought to produce a polymeric melt blend having some degree of crystallinity and hence less tendency to stick to a moderately warm surface. The blends of the present invention can readily be produced utilizing conventional process equipment and procedures as utilized in processing homopolymers or copolymers of polyesters. Hence, the blends of the present invention can be made on a commercial basis.

When the specific polyesters are melt blended according to the present invention, it has been found that a slight intrinsic viscosity drop may occur. However, the final blend should have an intrinsic viscosity of at least 0.4, generally 0.5 or more, and preferably 0.7 dl/g in a 60–40 solution of phenol and tetrachloroethane at about 30° C. Moreover, blending generally results in improved permeability resistance with regard to oxygen than possessed by either PET or PBT, individually, as well as improved processability. Such properties are unexpected. Moreover, such improved permeability resistance as well as processability is much greater than that obtained by the same proportions of polyesters in a copolymer. Generally, other properties such as crystallinity and impact resistance are also improved as compared to PEI with very little loss in PEI's barrier resistance. Thus, the blends of the present invention will generally have some crystallinity as opposed to PEI which is always amorphous. Such crystallinity also aids in improved handling characteristics as for example faster resin drying times at higher temperatures, reduction of sticking, and the like. Also, improved melt strength is generally obtained which is important in forming films and molded objects. Crystallinity is imparted to the blend by the PET or the PBT. Although the PBT generally has low glass transition temperature, for example about 35° C., it is generally highly crystalline. Thus, it imparts good processing properties to the blend. Moreover, it has been found that the mole fraction of the polyesters, and not the molecular weight, dictates the melting point temperature of the blend.

The blends of the present invention generally have an oxygen permeability resistance of 8 or less cc·mil/100 in$^2$·day·atm, desirably 7 or less, and preferably 6 or less. The permeability of carbon dioxide is generally 50 or less, desirably 30 or less and preferably 20 or less. These results relate to unoriented pressed polyester film.

As noted above, the various components of the blend can be made in any conventional manner. Additionally, they may be made in accordance with the teachings of the patents simultaneously filed herewith such as U.S. Pat. No. 4,418,188 which relates to the preparation of polyethylene isophthalate having reduced dimer content, U.S. Pat. No. 4,424,337 which relates to reduced dimer content utilizing chain modifying agents, and to U.S. Ser. No. 415,305 U.S. Pat. No. 4447595 which relates to the preparation of polyethylene terephthalate of high clarity.

The blends of the present invention are particularly suitable for uses of packaging material, be it in the form of molded containers, a film, or the like. Various containers can be filled with comestibles, for example food stuffs, or the containers can be blow molded and used for carbonated beverages, for example soft drinks, various juice drinks, i.e., orange juice, grapefruit juice, etc., as medicine bottles, and the like. A particular suitable bottle use is for alcoholic beverages such as beer, wine, liquor and the like. Desirably, the intrinsic viscosity of the blend for making a container is 0.7 dl/g or higher. With regard to blow molded containers, the I.V. is generally 0.7 to 0.9. Additionally, films can be made and used to envelope various items such as meat, groceries, and the like.

The invention will be better understood by reference to the following examples which illustrate the preparation of the copolymers and the manufacture of the containers described herein.

EXAMPLE 1

(Comparative)

Polyethylene isophthalate (PEI) was prepared as follows:

A stainless steel reactor was charged with 4.0 pounds of dimethyl isophthalate, 2.85 pounds of ethylene glycol, and 2.6 milliliters of a 6 percent solution of manganese octanoate in mineral spirits. This mixture was heated under a nitrogen gas atmosphere from 183° C. to 220° C. over a 2.5 hour period during which 730 milliliters of methanol was distilled from the reaction mixture. The mixture was then transferred to a stainless steel polymerization vessel and 0.456 grams of antimony trioxide was added. The reaction temperature was raised from 220° C. to 234° C. over a one hour period. The pressure was gradually reduced over the next hour to about 0.5 millimeter mercury while the temperature was being raised at 265° C. During the next hour, the temperature was increased to 275° C. After an additional 2 to 5 hours at these conditions, the reactor was restored to atmospheric pressure using nitrogen gas and the polymer extruded from the reactor, quenched and pelletized. The intrinsic viscosity of the polymer prepared in this manner was in the 0.7 to 0.9 range. This polymer was dried in a vacuum oven (about 0.5 mm mercury) at about 50° C. for a period of about 1 week to obtain a moisture level of about 0.01 weight percent or less. The low moisture level is required to prevent significant molecular weight degradation during polymer processing and hence loss of polymer mechanical properties. The long drying time at low temperature (50° C.) is required to prevent sticking or lumping of the essentially non-crystallizable PEI polymer chips. A 1¾ inch extruder was used to prepare a 6–8 mil film from the dried resin. Extrusion temperatures were maintained in the 450° to 480° F. range. Care was taken to maintain the feed section or throat of the extruder at 100°–120° F. to prevent premature softening of the PEI which would lead to improper feeding and surging in the extruder. The PEI film exhibited very high barrier resistance with an oxygen permeability of 3 cc·mil/100 in$^2$·day·atm.

By comparison, polyethylene terephthalate (PET), a commercial film and bottle resin, exhibits an oxygen permeability of about 7–9 cc·mil/100 in$^2$·day·atm. PET is a crystallizable resin with a high melting point (about 260° C.) which permits rapid drying (about 8 hours) at 150° C. and enables easy processing in an extruder or injection molder.

Polybutylene terephthalate (PBT), a commercial engineering resin, is generally thought to be unsuitable for forming high clarity containers and films for packaging due to its high rate of crystallizability. PBT extruded film exhibited an oxygen permeability of 19 cc·mil/100 in$^2$·day·atm.

EXAMPLE 2

A small glass reactor was used to prepare melt blends from 0.77 intrinsic viscosity PEI and 0.70 intrinsic viscosity PBT. Three different blend compositions were prepared using blending times of 10 and 30 minutes. Blends were prepared by softening the PEI at 250° C. in a nitrogen atmosphere. Predried PBT was then added to the reactor with rapid stirring. Samples were removed after 10 and 30 minutes. Compression molded films (5–10 mils) were prepared at 480° F. for oxygen barrier measurements. Resin drying studies were conducted in a vacuum oven (about 0.5 mm Hg) at 150° C. for 16 hours. The results of these studies are shown in Table I, along with data for PBT and PEI. It can be seen that blends containing 10 and 20 weight percent PBT exhibit improved drying characteristics at 150° C. (slight sticking of resin chips) compared to PEI (complete loss of particle shape) while still maintaining improved barrier (<6 cc·mil/100 in$^2$·O$_2$ permeability) compared to PET (7–9 cc·mil/100 in$^2$). These blend compositions represent improved barrier materials which are expected to exhibit good processing characteristics as well. The blend containing 50 weight percent PBT exhibited excellent drying characteristics but did not offer improved O$_2$ barrier properties.

TABLE I

| PEI/PBT REACTOR MELT BLENDS | | | |
|---|---|---|---|
| Blend Ratio PEI/PBT | Blend Time at 250° C., min. | O$_2$ Permeability | Drying$^a$ Rating at 150° C. |
| 100/0 | — | 3 | D |
| 90/10 | 10 | 4.7 | B |
| 90/10 | 30 | 4.6 | B− |
| 80/20 | 10 | 5.2 | B+ |
| 80/20 | 30 | 5.3 | B |
| 50/50 | 10 | 9.7 | A |
| 50/50 | 30 | 12.3 | A |
| 0/100 | — | — | A |

$^a$Rating System:
A = No sticking of polymer chips; excellent shape retention
B = Some sticking of polymer chips; good shape retention
C = Substantial sticking of polymer chips; slight shape retention
D = Complete flow of polymer chips; No shape retention

EXAMPLE 3

A film of about 7 mil thickness was extruded from a blend of 0.77 intrinsic viscosity PEI and 0.70 intrinsic viscosity PBT. Two different blend compositions were utilized comprising 20 and 40 weight percent PBT. The two resins were individually dried to a low moisture level (<0.01%) and then physically mixed in pellet form in a drum tumbler at ambient temperature in a nitrogen atmosphere. A 1¾ inch extruder was used with barrel temperatures of 300° to 450° F. and die temperature of 450° F. A standard 2 roll cast system was used, with the first roll cooled to 60° F. and the second roll maintained at 100° F. Both compositions produced opaque films. Nearly clear samples were obtained for oxygen permeability testing by heat treating the extruded film in a press for about three minutes at 480° F., followed by rapid quenching in cold water. Oxygen permeability values of 5.6 and 5.0 cc·mil/100 in$^2$·day were obtained on the 20 and 40 percent PBT compositions, respectively.

EXAMPLE 4

Following the procedure of Example 2, melt blends were prepared from 0.77 intrinsic viscosity PEI and 0.70 intrinsic viscosity PET. Three different blend compositions were prepared using blending times of 10 and 30 minutes. In these blends, the predried PET was first melted at 265° C. followed by addition of predried PEI. Techniques for film preparation and oven drying studies are given in Example 2. Oxygen permeability and drying data are given in Table 2. In this series, all three blend compositions provided some improvement in shape retention compared to PEI in drying studies, with the 50 percent PET composition giving the best improvement. Two of the blend compositions were examined for barrier characteristics and exhibited improved oxygen barrier compared to PET.

TABLE II

| PEI/PBT REACTOR MELT BLENDS | | | |
|---|---|---|---|
| Blend Ratio PEI/PBT | Blend Time at 250° C., min. | O$_2$ Permeability | Drying Rating at 150° C. |
| 100/0 | — | 3 | D |
| 90/10 | 10 | — | C |
| 90/10 | 30 | — | C |
| 80/20 | 10 | — | C |
| 80/20 | 30 | 4.2 | D |
| 50/50 | 10 | 6.3 | B |
| 50/50 | 30 | 6.5 | D |
| 0/100 | — | 7–9 | A |

Rating System: Same as Table I

EXAMPLE 5

(Reactor Blends)

A charge of TPA and EG, sufficient to produce 15 pounds of PET, was reacted in an autoclave according to U.S. Pat. No. 4,020,049 (Rhinehart). This was followed by a condensation reaction with standard antimony catalyst to produce PET with an I.V. of ca 0.70. While still molten at ca 280° C., sufficient 0.7 I.V. PEI to give an overall terephthalate/isophthalate ratio of 80/20, was added to the reactor and stirred under a nitrogen purge for 10 minutes. The PEI had been previously dried and granulated. Afterwards, the clear molten polymer blend was discharged and pelletized. The above procedure was repeated except that the PET/PEI blend was stirred for 30 minutes before discharge.

These polymer blends were redried and extended into films using the procedure given in Example 3. Oxygen permeability values of 4.9 were obtained for both blends.

EXAMPLE 6

(Extruder Blend)

Dried granular PET and PEI of ca 0.70 I.V. were dry blended and extruded into film on a 1¾ inch extruder that was equipped with a coat-hanger die, a film casting and a film wind-up unit. Water cooling was employed on both the rear of the screw and also the feed section of the extruder barrel. Barrel temperatures sufficiently high to completely melt the PET (490° to 550° F.) caused the PEI to stick to the extruder screw even with cooling. This caused the extruder to periodically stop feeding. However, when the crystalline component of the blend was switched from PET to a lower melting 90/10 ET/I random copolymer, the extrusion barrel temperatures could then be lowered to 425° to 530° F., which substantially reduced the problem of sticking and loss of feed. Extruder blends were prepared from PEI and 90/10 ET/I copolymer, both resins having intrinsic viscosities of 0.7. Final blend compositions comprising T/I ratios of 80/20 and 70/30 exhibited oxygen permeabilities of 5.8 cc·mil/100 in² in each case.

While in accordance with the patent statutes, the best mode and preferred embodiment has been set forth, it will be apparent to those skilled in the art that various changes and modifications can be made without departing from the spirit or scope of the invention. Accordingly, the invention is measured by the scope of the attached claims.

What is claimed is:

1. A melt blend of polyesters having good oxygen barrier resistance, consisting essentially of:
the melt product of two polyesters, one of said polyesters being polyethylene isophthalate homopolymer in an amount of from about 5 to about 95 mole percent and the remaining 95 to 5 mole percent being polyethylene terephthalate homopolymer, said mole percent based upon the total moles of said polyesters, the melt blend having an oxygen permeability of 8 cc·mil/100 in²·day·atm or less and an intrinsic viscosity of 0.4 dl/g or greater.

2. A melt blend of polyesters according to claim 1, wherein the amount of said polyethylene isophthalate ranges from about 10 to about 90 mole percent.

3. A melt blend of polyesters according to claim 2, wherein said oxygen permeability is 7.0 or less and wherein said intrinsic viscosity is 0.5 or greater.

4. A melt blend of polyesters according to claim 3, wherein said oxygen permeability is 6.0 or less, and wherein said intrinsic viscosity is 0.7 or greater.

5. A melt blend of polyesters according to claim 4, wherein said blend contains from about 10 to about 35 mole percent of polyethylene isophthalate.

6. A melt blend of polyesters according to claim 4, wherein said blend contains from about 90 to about 65 mole percent of polyethylene isophthalate.

7. A melt blend of polyesters according to claim 1, 2, 4, 5, or 6, wherein said polyester blend is in the form of a container.

8. A melt blend of polyesters according to claim 7, wherein said container is in the form of a bottle.

9. A melt blend of polyesters according to claim 1, 2, 4, 5, or 6, wherein said melt product is formed by extruded blending or reactor blending.

10. A melt blend of polyesters, consisting essentially of:
two polyesters melt blended to form a high oxygen barrier melt blend polyester product, one of said polyesters being polyethylene isophthalate homopolymer, the amount of said polyethylene isophthalate homopolymer ranging from about 5 to 95 mole percent and the remaining 95 to 5 mole percent being polyethylene terephthalate homopolymer, said mole percent based upon the total moles of said polyesters blended, the intrinsic viscosity of said melt blend product being 0.4 dl/g or greater and said melt blend having an oxygen permeability of 8.0 cc·mil/100 in²·day·atm or less.

11. A melt blend of polyesters according to claim 10, wherein said melt blend polyester product is formed by heating said polyesters at a temperature above the melting point of the highest melting point polyester.

12. A melt blend of polyesters according to claim 11, wherein the amount of said polyethylene isophthalate ranges from about 10 to about 90 mole percent, wherein said oxygen permeability is 7.0 or less, and wherein said intrinsic viscosity is 0.5 dl/g or greater.

13. A melt blend of polyesters according to claim 12, wherein said oxygen permeability is 6.0 or less, and wherein said intrinsic viscosity is 0.7 dl/g or greater.

14. A melt blend of polyesters according to claim 13, wherein the amount of said polyethylene isophthalate ranges from about 10 to about 35 mole percent.

15. A melt blend of polyesters according to claim 13, wherein said polyethylene isophthalate ranges from about 90 to about 65 mole percent.

16. A melt blend of polyesters according to claim 10, 11, 13, 14, or 15, wherein said polyester blend product is formed by reactor blending or extruder blending said polyesters.

17. A melt blend of polyesters according to claim 10, 11, 13, 14, or 15, wherein said melt blend is in the form of a bottle.

* * * * *